(12) United States Patent
Tunning

(10) Patent No.: US 7,178,101 B2
(45) Date of Patent: Feb. 13, 2007

(54) CONTENT TEMPLATE SYSTEM

(75) Inventor: Brian R. Tunning, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 476 days.

(21) Appl. No.: 10/602,572

(22) Filed: Jun. 24, 2003

(65) Prior Publication Data
US 2004/0268231 A1  Dec. 30, 2004

(51) Int. Cl.
*G06N 3/00* (2006.01)
(52) U.S. Cl. .................... 715/513; 715/519
(58) Field of Classification Search ................ 715/513, 715/523, 522; 707/501; 709/203
See application file for complete search history.

(56) References Cited

U.S. PATENT DOCUMENTS

| | | | | |
|---|---|---|---|---|
| 5,987,480 | A * | 11/1999 | Donohue et al. ......... | 715/501.1 |
| 6,397,217 | B1 * | 5/2002 | Melbin ...................... | 707/10 |
| 6,558,431 | B1 * | 5/2003 | Lynch et al. .............. | 715/513 |
| 6,732,331 | B1 * | 5/2004 | Alexander ................. | 715/513 |
| 6,823,359 | B1 * | 11/2004 | Heidingsfeld et al. .... | 709/203 |
| 6,826,594 | B1 * | 11/2004 | Pettersen .................. | 709/203 |
| 6,970,861 | B2 * | 11/2005 | Messler .................... | 707/3 |
| 2002/0095435 | A1 * | 7/2002 | Graham ..................... | 707/201 |
| 2002/0122054 | A1 * | 9/2002 | Hind et al. ................ | 345/731 |
| 2003/0014443 | A1 * | 1/2003 | Bernstein et al. ......... | 707/513 |
| 2003/0137540 | A1 * | 7/2003 | Klevenz et al. ........... | 345/762 |

OTHER PUBLICATIONS

Esposito, Element Behaviors in Internet Explorer 5.5, Dec. 2000, Cutting Edge, MSDN Magazine, pp. 1-12.*
Esposito, Advanced Behavior Programming With Internet Explorer 5.X, 2000, Wrox Conferences, pp. 1-8.*
Nadav, Introducing DHTML Behaviors, Nov. 1998, Webmonkey, pp. 1-5.*

* cited by examiner

*Primary Examiner*—Stephen Hong
*Assistant Examiner*—Manglesh M. Patel
(74) *Attorney, Agent, or Firm*—Lee & Hayes PLLC

(57) ABSTRACT

Subject matter includes an exemplary content template system. In one implementation, a custom markup tag locates remote content, converts the remote content into a markup language used in a web page template, replaces the custom markup tag with the converted content, and dynamically updates the converted content in the web page template when the remote content or the converted content changes. Another custom markup tag displays dynamic updates of the converted content in real-time in a web generated by the web page template. Yet another custom markup tag presents editing controls for editing the converted content in the web page template, wherein the editing is displayed in real-time in the web page generated by the web page template.

6 Claims, 11 Drawing Sheets

Exemplary Screen Shot — 600

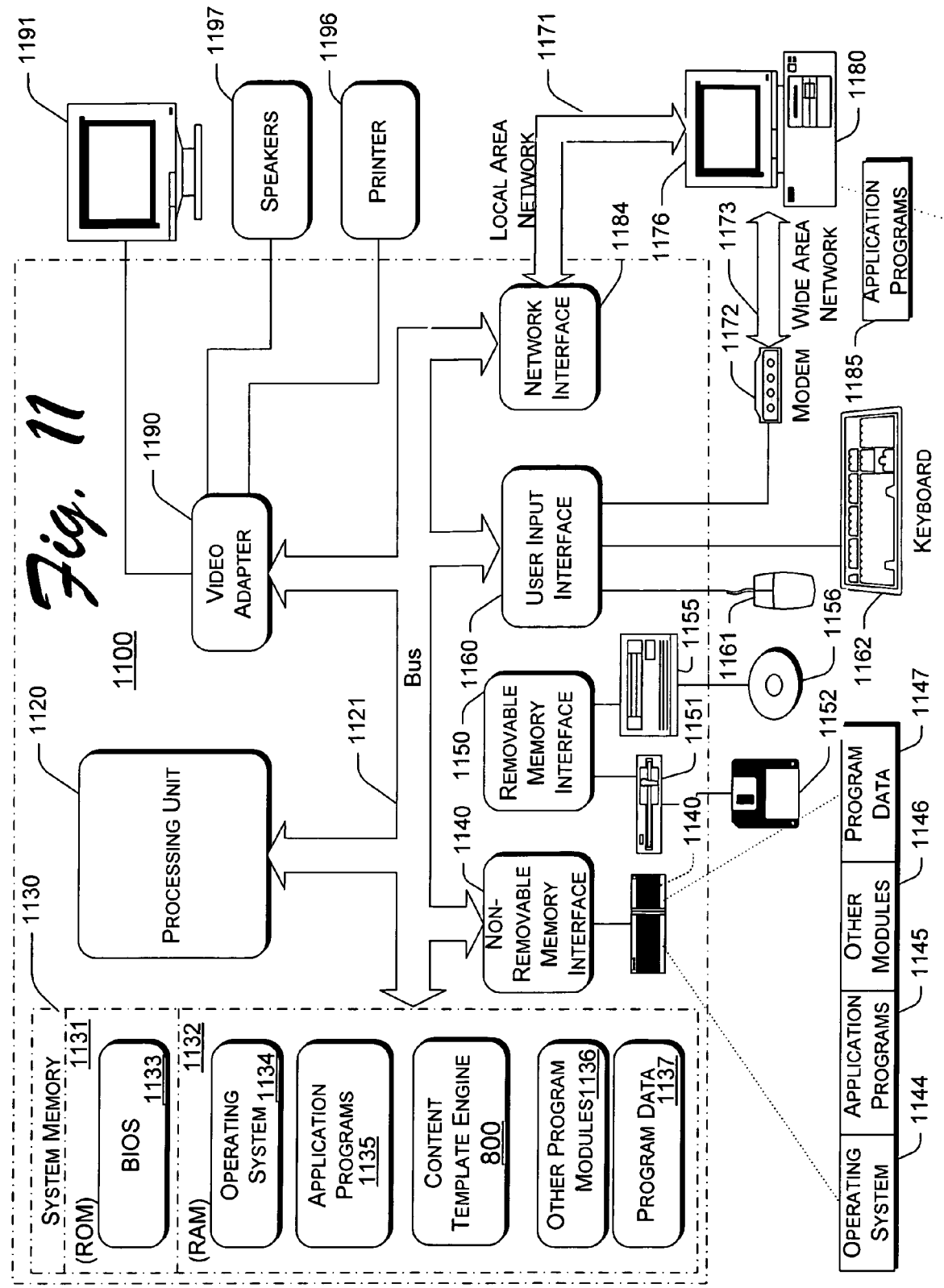

CONTENT TEMPLATE SYSTEM

CROSS-REFERENCE TO RELATED APPLICATIONS

The instant application is related to co-pending U.S. patent application Ser. No. 10/602,573, entitled "Pane Element" by Brian Tunning, filed Jun. 24, 2003, and incorporated herein by reference for all that it teaches and discloses.

COMPUTER PROGRAM LISTINGS

Four sets of hyper text markup language component (.htc) text file listings used in accordance with the subject matter are provided in Appendices A, B, C, and D after the abstract on 27 sheets of paper and incorporated by reference into the specification. The four .htc text file listings define exemplary element behaviors of various exemplary content template system tags and an exemplary context object described as part of the subject matter.

Technical Field

The subject matter relates generally to web page authoring and more specifically to a content template system.

BACKGROUND

Oftentimes, a content management system for presenting information on web pages uses various separate documents to blend content with markup indicators ("tags") for displaying the content. A markup language, such as hypertext markup language (HTML), creates a web page document that specifies particular visual structures to be populated with the content, which may reside in separate content resource documents on remote databases. A style sheet is yet another document or document fragment that allows attributes and layouts for web page formatting accomplished by each tag in one or more web page documents to be specified globally in one centralized location—i.e., the style sheet. A conventional web page template is yet another kind of document that may contain variables wherein static links to various resources can be substituted for the variables by a web designer in an attempt to outfit a "canned" web page design with new content.

Conventionally, to create and/or edit a web page document, associated content stored in a database, and an associate style sheet may require a web page designer (who may also need significant programming skill) to switch between editors and documents to make changes in the various documents and data sources. For example, content in the form of a database-driven extensible markup language (XML) document, can be marked up via a style sheet, but the process is somewhat awkward and requires multiple steps. To create a web page table, for example, four steps might be needed: first, content elements, such as the strings "James" and "Brian" are retrieved from an XML repository, such as a remote database:

```
<root>
    <employee>James</employee>
    <employee>Brian</employee>
</root>.
```

Secondly, an XML style sheet is developed to render an XML document of the format above, into a presentable HTML document:

```
<?xml version="1.0" encoding="UTF-8"?>
<xsl:stylesheet>
    <xsl:output method="xml" version="1.0" encoding="UTF-8"
    indent="yes"/>
    <xsl:template match="root">
        <table class="normal" cellpadding="1"
        cellspacing="1" border="0" width="100%">
            <tr style="background-color:#9ccfff;color:black">
                <td class="normal">employee</td>
            </tr>
            <xsl:for-each select="employee">
                <tr>
                    <td>
                        <xsl:value-of select="."/>
                    </td>
                </tr>
            </xsl:for-each>
        </table>
    </xsl:template>
</xsl:stylesheet>
```

Thirdly, processes using DHTML ("dynamic-HTML") and script associated with a web page document may use an XML parser to transform the XML document using the style sheet. (DHTML has behavior components that encapsulate specific functionality or behavior on a page. These "behaviors" can isolate script from content, resulting in cleaner web page documents.)

Fourthly, the desired table is displayed by the browser, showing the result of the above transform.

A conventional method, such as that described above, presents several problems. First, the conventional method may be limited to a relatively elite set of web page developers skilled in making the above-mentioned transformation, for instance via extensible style sheet language transformations (XSLT).

It may also be difficult to transform the content, in one type of data structure or language, into that of the markup language, if the two are not compliant. Regarding the example above, XHTML is a family of current and future document types and modules that are designed to work in conjunction with XML-based user agents, but if the data content is not XHTML compliant then it is difficult to display the content as HTML in the output.

As indicated, the conventional method does not provide a web designer working on the web page document an integrated means for editing XML data that resides in a database remote from the web page document and does not provide for persisting changes in the XML data back to the remote database. In fact, in order to update the result of the transformation using new data, the entire XML document must be re-transformed using the style sheet and, to see how the update looks in real time, the entire resulting HTML tree must be re-interpreted by a browser, seriously lowering performance, and possibly making certain complex style sheets infeasible.

SUMMARY

Subject matter includes an exemplary content template system "CTS." In one implementation, a custom markup tag locates remote content, converts the remote content into a markup language used in a web page template, replaces the custom markup tag with the converted content, and dynamically updates the converted content in the web page template when the remote content or the converted content changes. Another custom markup tag displays dynamic updates of the converted content in real-time in a web page generated by the web page template. Yet another custom markup tag presents editing controls for editing the converted content in the web page template, wherein the editing is displayed in real-time in the web page generated by the web page template.

BRIEF DESCRIPTION OF THE DRAWINGS

FIG. 11 is a block diagram of an exemplary computing device suitable for use with the subject matter.

DETAILED DESCRIPTION

Overview

Figure 1:
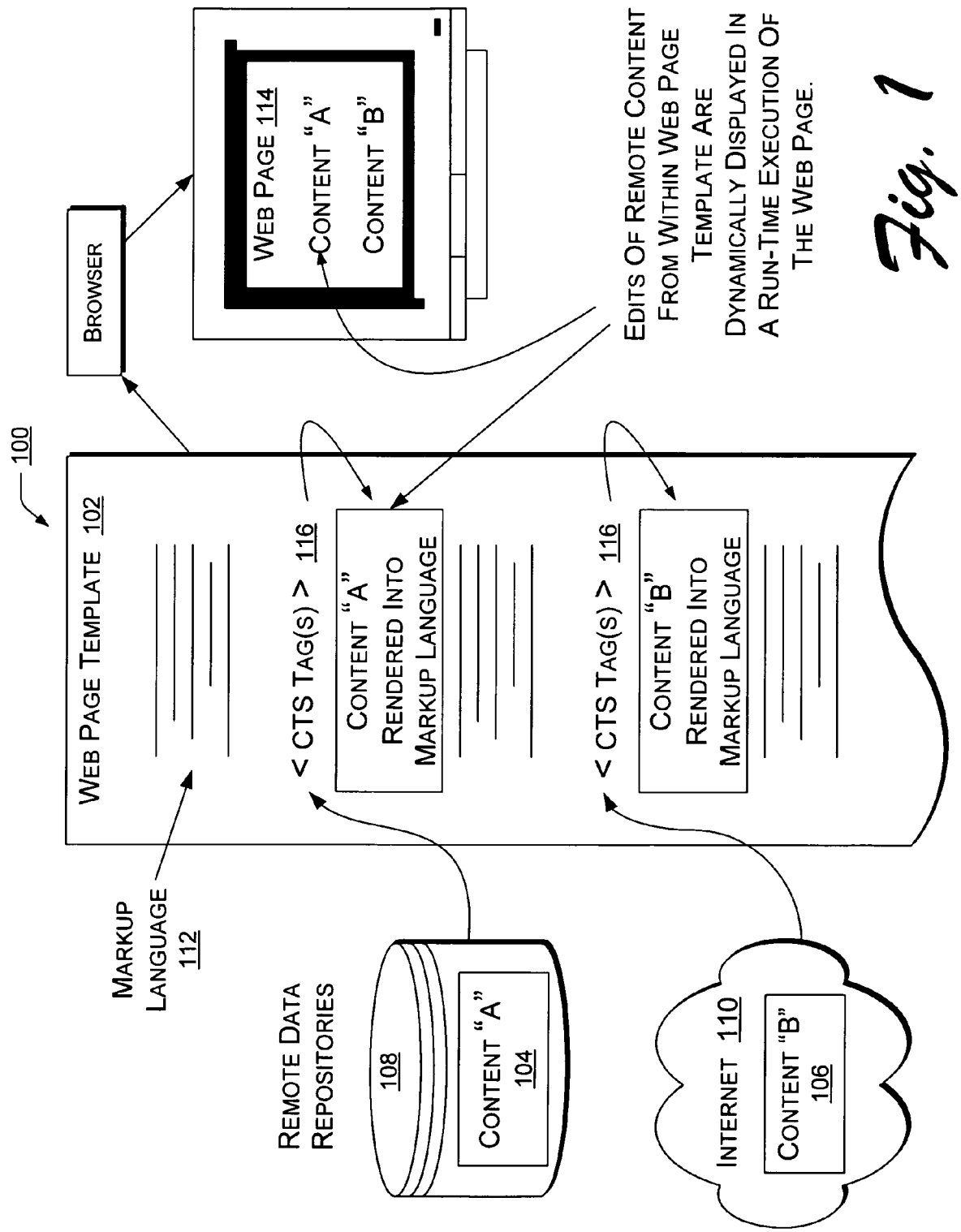
FIG. 1 is a graphic representation of an exemplary content template system.

As shown in FIG. 1, the disclosed subject matter includes an exemplary content resource system ("CRS") and/or content template system ("CTS") 100 for creating and editing a web page template 102 that populates itself with remote content 104 (and 106) from remote data repositories 108 (and 110). The remote content 104 has is from sources external to and/or remote from the web page template 102. The exemplary CTS 100 has a run-time editing capability that allows a web designer, without leaving a web page-editing environment, to reach the aforementioned remote content 104 and perform editing even as the remote content 104—including changes from real-time editing—is being displayed as an executed web page 114. That is, a web designer can create and edit a web page template 102 and associated remote content 104 for a complex web page 114 and, without special programming knowledge with respect to underlying database structure and language, can edit the underlying remote content 104 from within a web page template 102 as changes to the underlying remote content 104 are being displayed "live" in a run-time execution of the web page 114.

The exemplary CTS 100 allows web designers with or without significant programming skill to automatically build style sheets and alter database resources within the markup language environment (e.g., HTML) of the web page template 102 rather than through more complex means such as XSL, XSLT, and/or XHTML. This allows much more freedom and flexibility, and lowers the difficulty barrier for a web designer to create and edit a web page 114. In other words, a web designer can use an exemplary HTML web page template 102 directly as a style sheet and remote content editor. The web page template 102 receives remote content 104, 106 from remote data repositories 108, 110 and populates itself with the remote content 104, 106 rendered into the markup language of the web page template 102. Thus, a web designer can make changes without having to first leave the web page template 102 to redo content 104 in a remote data repository 108 and without having to redo a separate style sheet.

In an exemplary HTML web page template 102, remote content 104, 106 can be represented and edited through the agency of exemplary CTS custom tags ("CTS tags") 116. One type of CTS tag 116 substitutes itself with remote content 104 from a remote data repository 108 at run time and/or edit time, by a web browser. The substituted remote content 104 is rendered in the web page template 102 into the same markup language 112 being used in the web page template 102, and as discussed above, an exemplary CTS 100 also defines a means for dynamically updating some CTS tags 116, rendered into the markup language, as the underlying remote content 104 changes.

In one implementation, element behaviors are used to impart functionality to exemplary CTS tags 116. A browser, upon encountering a CTS tag 116 having a bound element behavior, finds an HTML-component (HTC) file (e.g., "resource.htc") and performs custom code representative of the element behavior, which typically causes a CTS tag 116 to render itself as HTML, replacing the entire CTS tag 116 with the HTML rendered. Thus, the custom code underlying an element behavior of a CTS tag 116 is typically referenced in an HTC file by the browser when the browser requests that the tag be rendered. The browser may pass a value of an attribute to the custom code in order for the custom code to identify the web page template 102 requesting content 104 and may also pass a reference to the place in the web page template 102 where the exemplary CTS tag 116 resides. The custom code associated with the assigned element behavior reads a resource at the location indicated by the resource attribute, and interacts with the resource, e.g., reads an XML file containing remote content 104 and performs whatever process is needed to obtain the remote content 104 at the indicated location and convert it to a markup language, such as HTML, that is in use in the web page template 102.

In one implementation, a user can markup HTML however desired, e.g., can use normal HTML, bold tags, tables, italic signs, etc. Once marked up, a CTS tag 116 that is placed inside a block of HTML assumes whatever style(s) have been marked up. This assists a web designer trying to visualize results of a web page for localization or other purposes to automatically observe the content 104 rendered in a real-time web page 114.

Exemplary Types of CTS Tags

Figure 2:
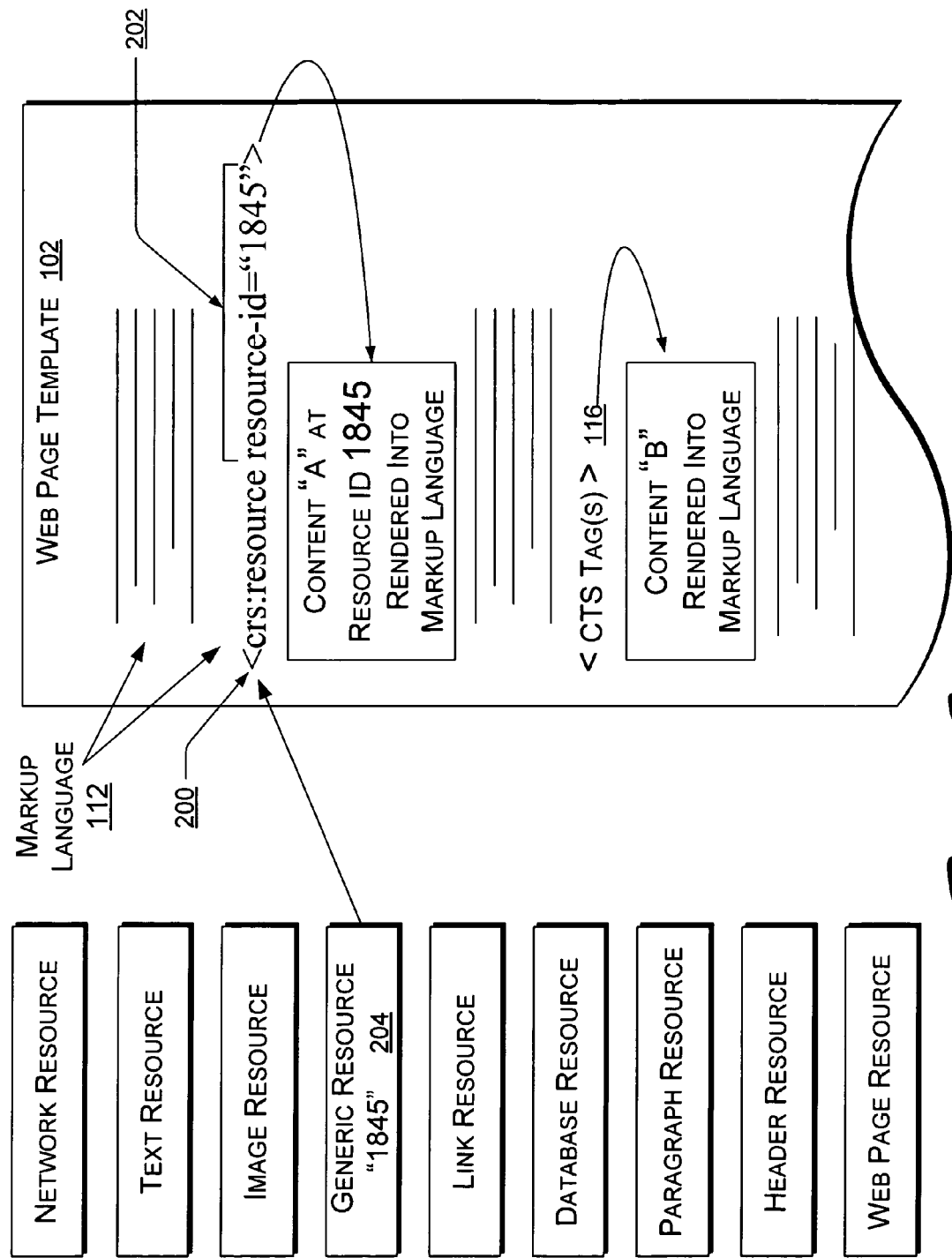
FIG. 2 is a graphic representation of am exemplary resource tag.

FIG. 2 shows one type of CTS tag 116, as discussed above, referred to as an exemplary "resource tag" 200. Each resource tag 200 may have a resource attribute 202 that directs a browser to a location of a resource 204 having remote content 104 (the "cts" in the tag designates the exemplary CTS 100):

<cts:resource resource-id="1845">

A resource 204 thus referenced can be a database, network, text, image, link, image with a link, paragraph, header, another web page, etc. that includes remote content 104. Typically, a list of all resources 204 seen on a web page 114 is included in an XML file. In one implementation, when a browser encounters an exemplary resource tag 200, the exemplary resource tag 200 is set up to inform a client-side application to render it. Typically, this means that the application receives the resource attribute 202, determines the nature of the requested resource, and renders remote content 104 from the resource 204 into the markup language 112 used in the web page template 102, e.g., HTML.

Figure 3:
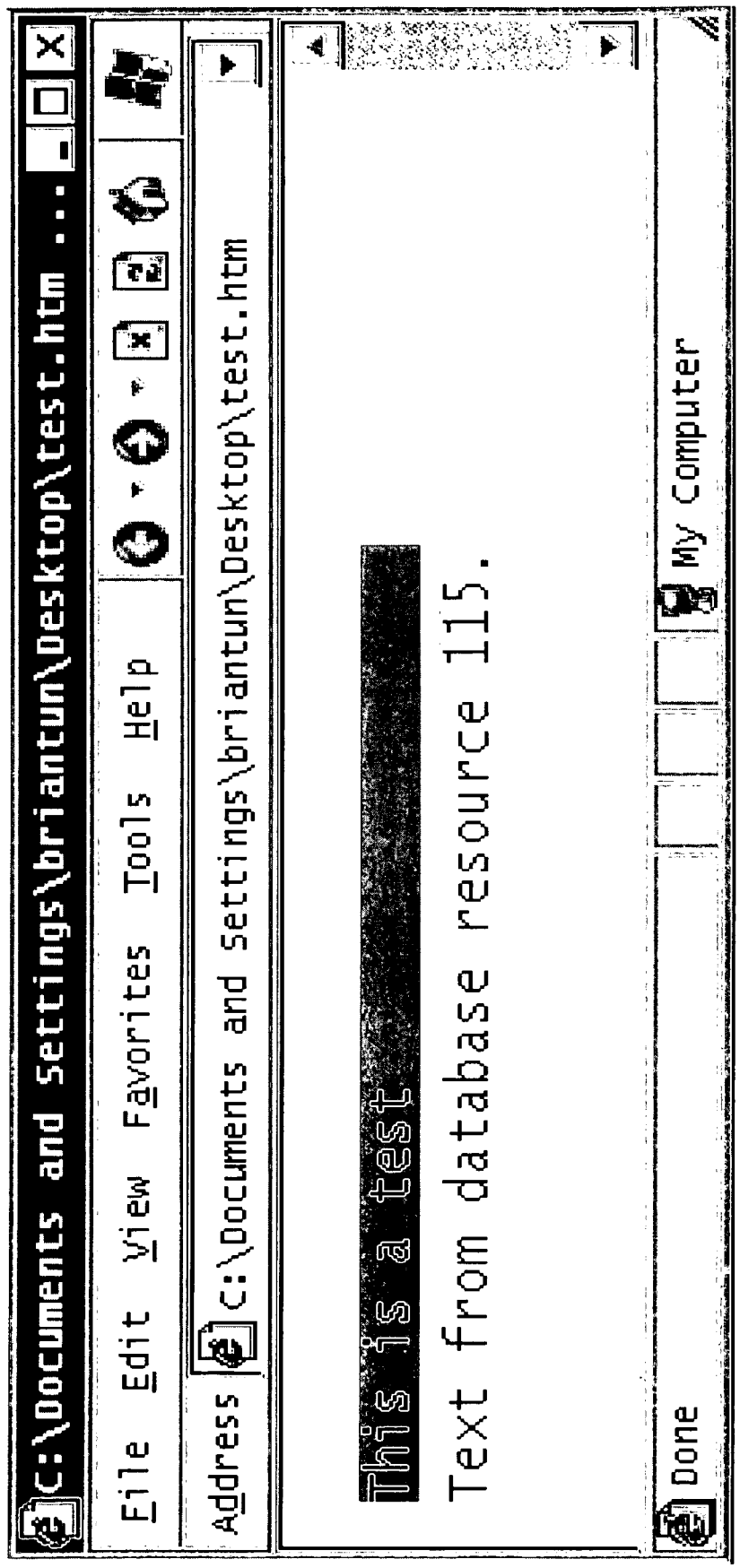
FIG. 3 is an exemplary screen shot generated by an exemplary content template system graphically showing text content from a remote resource rendered as web page content.

FIG. 3 shows an exemplary screen shot 300 generated by an exemplary web page template 102, listed below, that includes an exemplary resource tag 200 at line 17. The screen shot 300 further exhibits an exemplary user interface.

```
<cts:template>
    <table border="0" cellspacing="5" cellpadding="0" style="font
    family:lucida console">
        <tr>
            <td bgcolor="LightSteelBlue">This is a test</td>
        </tr>
        <tr>
            <td bgcolor="MistyRose">
                <cts:resource resource-id="115"/>
            </td>
        </tr>
    </table>
</cts:template>
```

As shown graphically in the exemplary screen shot 300, when a browser encounters the exemplary resource tag 200 in the HTML, the browser renders the remote content 104 from a resource at location "115."

A representation of an exemplary HTC file defining an element behavior of an exemplary resource tag 200 appears in Appendix A: "Exemplary HTC File Defining An Exemplary CTS Resource Tag." A representation of an exemplary HTC file defining a conditional element behavior of an exemplary resource tag (an "if-resource" tag appears in Appendix B: "Exemplary HTC File Defining An Exemplary CTS If-Resource Tag."

Figure 4:
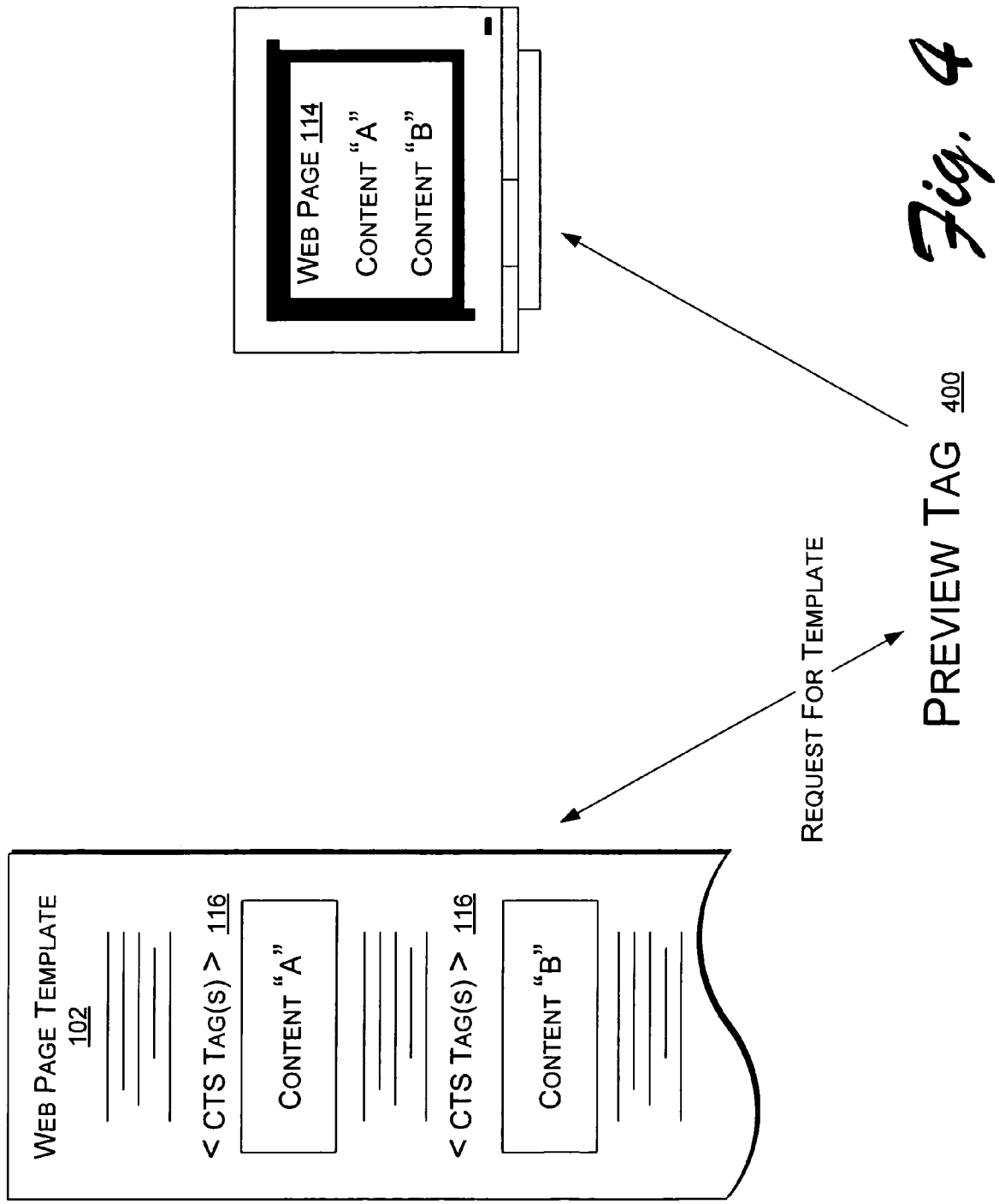
FIG. 4 is a graphic representation of am exemplary preview tag.

As shown in FIG. 4, an exemplary "preview" tag 400 allows an exemplary CTS 100 to present a run-time display of a web page 114 corresponding to a web page template 102 including dynamically changing content 104 from a resource 204. An exemplary preview tag 400 can precede the declaration of a template, which in turn may contain one or more exemplary CTS tags 116, in the general sequential order shown in the listing below in order to perform the display of the template and rendered CTS tags 116 in real-time as a web page:

```
<preview/>
<template>
    <CTS tag>
</template>.
```

If the CTS tag 116 in the listing above is an exemplary resource tag 200, then an exemplary preview tag 400 can display dynamic updating of the resource tag 200 as its underlying content 104 changes. Depending on the type of resource 204 (text, image, link, paragraph, another page, etc.), an external application, as requested by custom code backing an element behavior of an exemplary CTS tag 116, returns HTML to the browser, which then executes a web page with the HTML, even if the HTML is changing during run-time, as when the resource 204 is a keyboard editing the underlying content 104.

A representation of an exemplary HTC file defining an element behavior of an exemplary preview tag 400 appears in Appendix C: "Exemplary HTC File Defining An Exemplary CTS Preview Tag."

Figure 5:
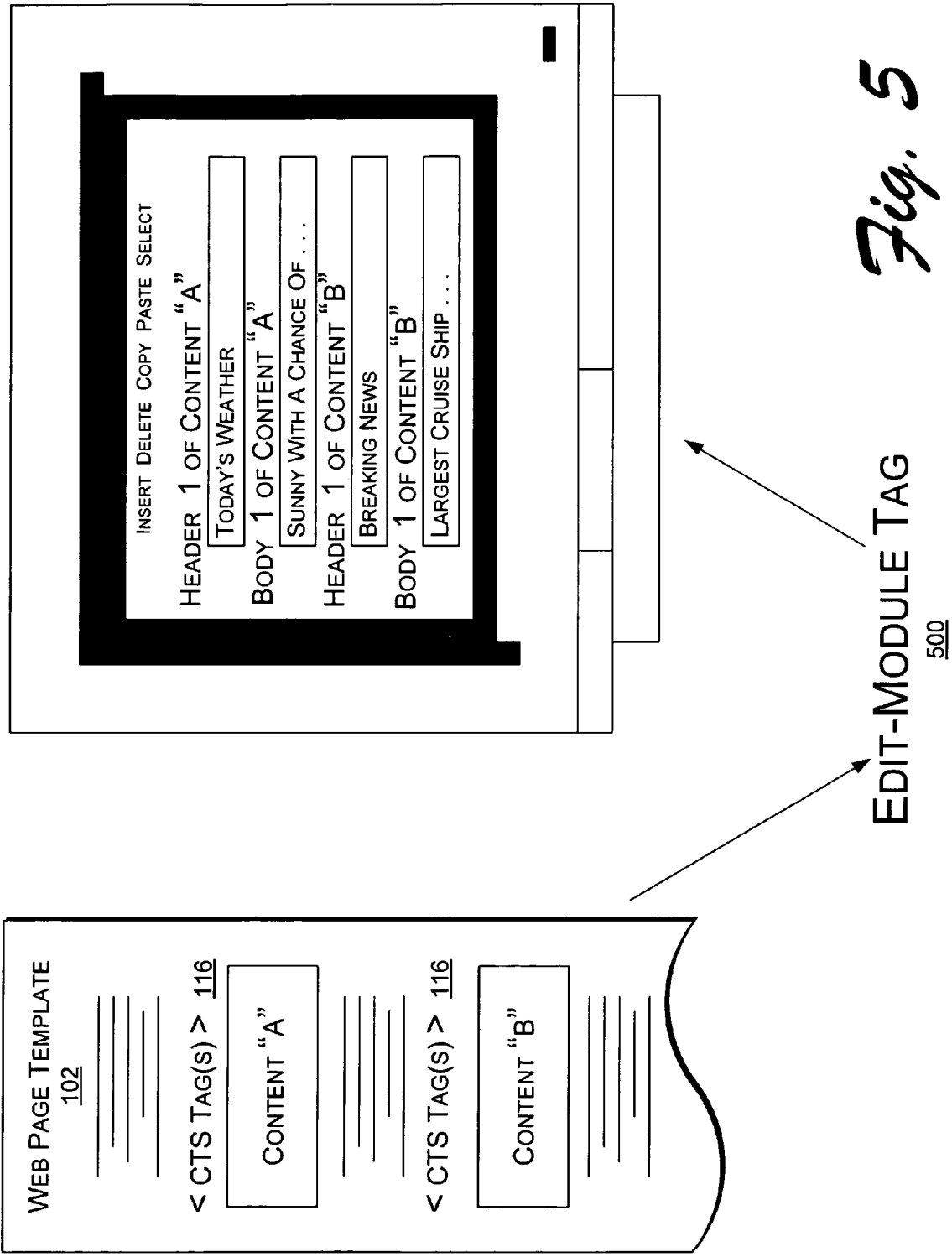
FIG. 5 is a graphic representation of an exemplary edit tag.

FIG. 5 shows an exemplary "edit" tag 500 that can be set up to enable editing controls for remote content 104 returned in the form of the web page template's markup language, e.g., HTML, to a browser. In conjunction with an exemplary preview tag 400, and with an exemplary resource tag 200 set up with a local copy of the remote content 104, a web designer's keyboard, or other input means as the resource 204 (as identified in the resource attribute 202), an exemplary edit tag 500 produces editing controls for the run-time web page preview of remote content 104 as it is edited within its web page context, as discussed above.

Other CTS tags 116 are possible, such as a "template" tag to inform a browser which template to edit and/or preview, and a "pane" tag described more fully in the above cited U.S. patent application Ser. No. 10/602,573 to Tunning, entitled "Pane Element." The exemplary CTS tags 116 described above are only an example set of possible CTS tags 116 usable with an exemplary CTS 100.

Exemplary CTS Tags Harmonized into a Content Template System (CTS)

The CTS tags 116 described above can work together to implement an exemplary CTS 100. Each instance of the abovementioned pane tag implements a display screen area ("pane") on a web designer's computer monitor. Within a first pane, an exemplary edit tag 500 implements editing controls. Simultaneously, in a second exemplary pane an exemplary preview tag 400 displays a run-time browser execution of a web page 114 as generated by an exemplary web page template 102 and associated remote content 104 converted to HTML via an exemplary resource tag 200. In one implementation, edit controls implemented by an exemplary edit tag 500 work on a local version of remote content 104 as opposed to conventional editing, in which an edit control is statically bound to pieces of content on a web page document in a hard coded manner.

Figure 6:
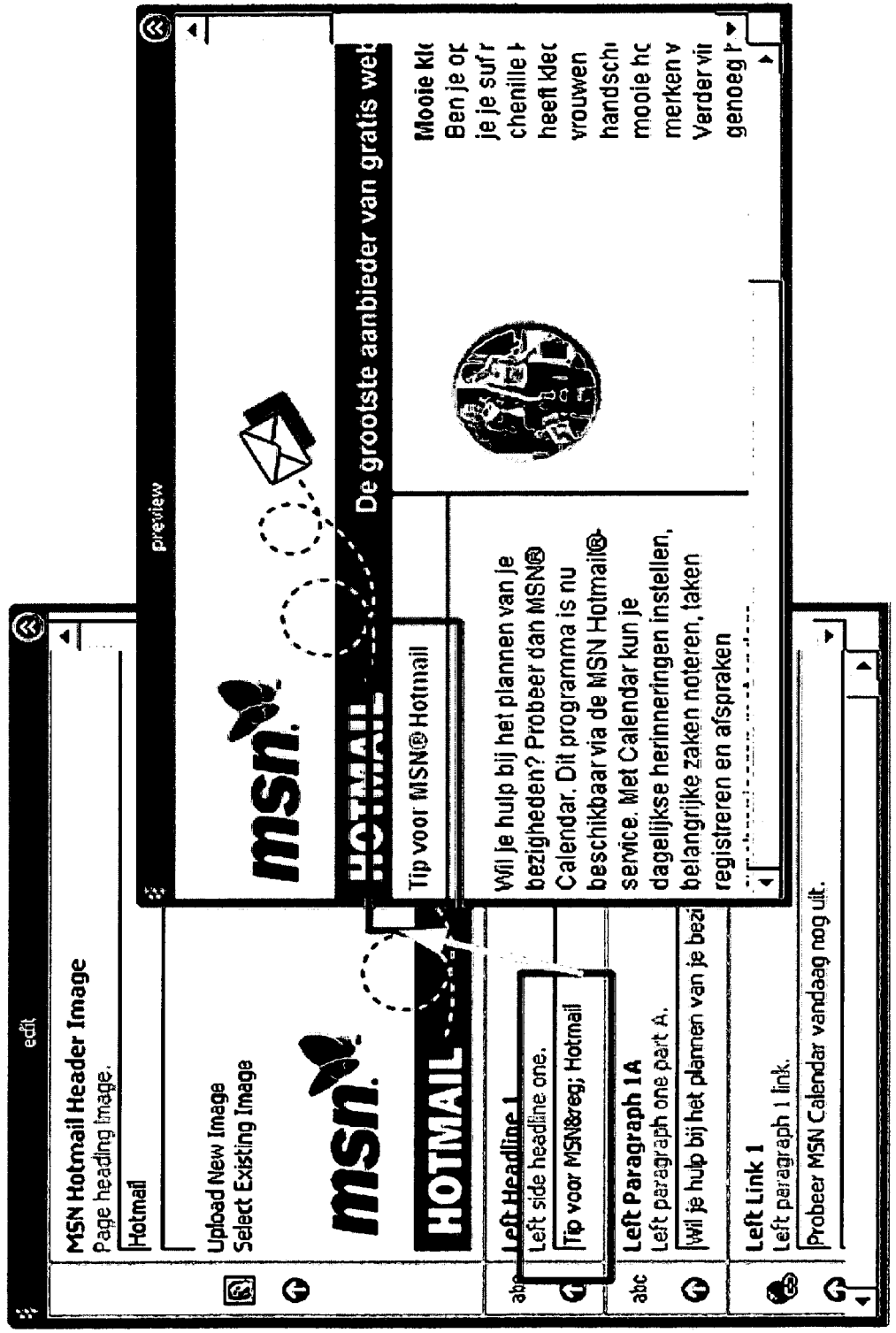
FIG. 6 is an exemplary screen shot generated by an exemplary content template system showing edits to remote content substituted into a web page template being previewed in real-time in a web page generated from the web page template.

FIG. 6 shows an exemplary screen shot 600 generated by an exemplary CTS 100 having a harmonization of CTS tags 116 as described above. The screen shot 600 further exhibits an exemplary user interface. In screen shot 600, the pane labeled "preview" displays a web page 114 as generated by an exemplary preview tag 400 using a web page template 102 similar to those discussed above, although more complex. The pane labeled "edit" displays editing controls as generated by an exemplary edit tag 500. Changes to content 104 are shown dynamically in the preview pane. As a web designer or user enters editing changes into the various text boxes on the edit pane, the preview pane updates in real time to show the changes. This exemplary CTS 100 system allows very complex templates to be created and updated with a real-time preview of the dynamically changing web page 114, without special programming knowledge for each underlying type of content 104 to be substituted and edited from a resource 204 into a web page 114.

In one implementation, an exemplary CTS 100 relies on a client-side browser to react with remote resources 204 and remote data repositories 108, 110. Thus, the interfacing with various heterogeneous remote resources 204 happens almost completely on the client side of an exemplary CTS 100. In one implementation, a remote resource 204 only plays a part when a web page template 102 first loads, i.e., when remote content 104 is rendered into HTML and substituted into a web page template 102. From that point, the exemplary CTS 100 through the above-described CTS tags 116 (e.g., an exemplary resource tag 200, an exemplary preview tag 400, and/or an exemplary edit tag 500) scans a web designer's keyboard or other input device or user interface. Each time the web designer actuates a key, for example, an exemplary CTS 100 edits a local copy of the remote content 104 previously loaded. Thus, in some implementations, an exemplary resource tag 200 mainly performs the function of requesting a most recent version of content, whatever the source of the content 104 may be, and user-defined and/or system-defined code determines where the most recent content is. Typically, if a user enters content after a web page 114 has loaded, the user's new content will override the content that previously existed. The above-mentioned user-defined and/or system-defined code for specifying the source of most-recent content may be kept in an exemplary context object, to be described next.

Figure 7:
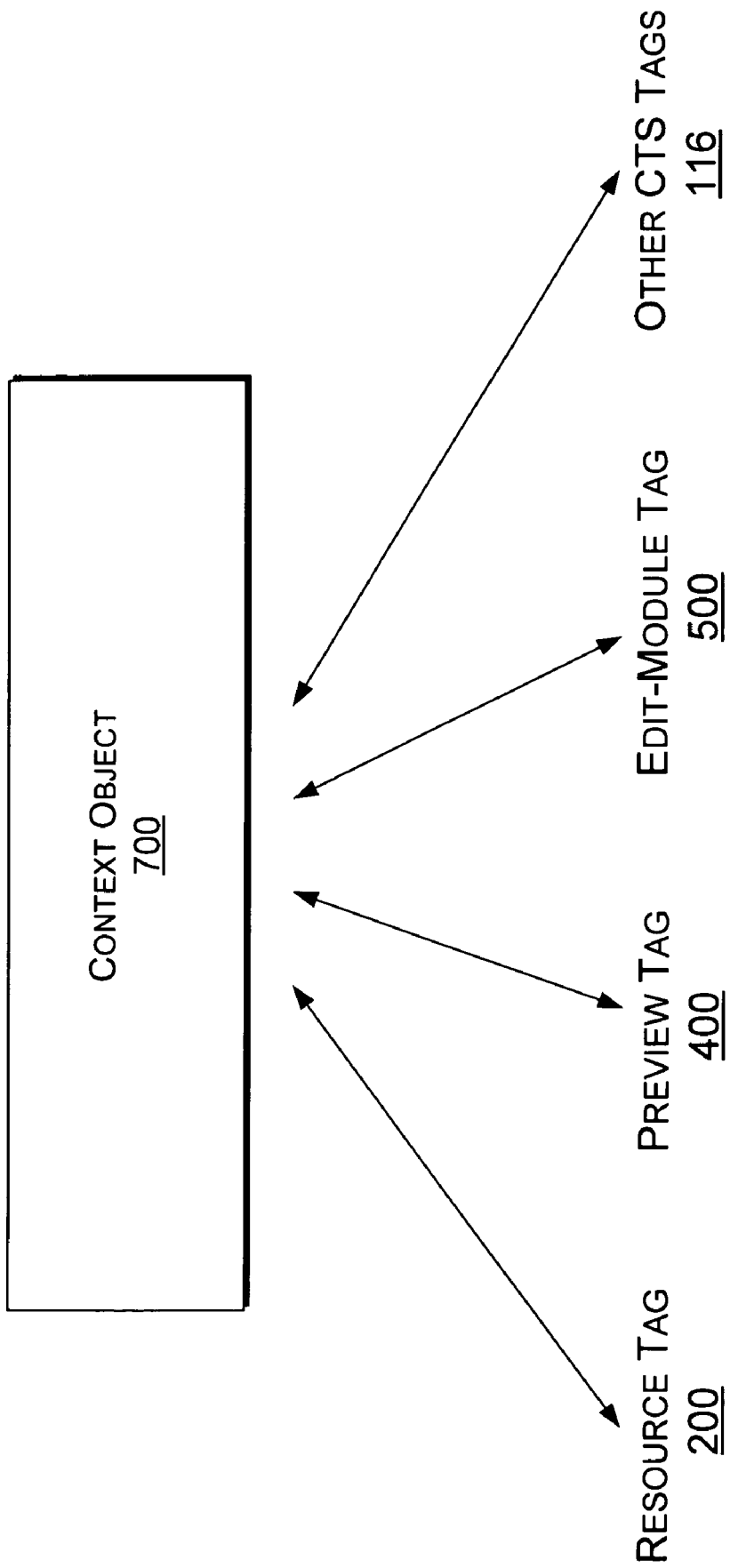
FIG. 7 is a graphic representation of an exemplary context object.

As shown in FIG. 7, an exemplary "context object" 700 can coordinate various CTS tags 116 and their respective element behaviors. When a browser renders multiple CTS tags 116, the context object knows that these multiple CTS tags 116 and their element behaviors are present and knows the relationships between them. Thus, one exemplary context object 700 can be a data store for all CTS tags 116 used in an exemplary CTS 100, so that the presence of just one context object 700 allows all CTS tags 116 to obtain their data. When an exemplary edit tag 500, for example, is to be rendered, the context object 700 passes data that is used to produce the editing controls that the web designer uses. Likewise, an exemplary preview tag 400, when rendered, requests from the context object 700 a web page template 102 that is to be previewed. The browser requests that the web page template 102 render itself, and the context object 700 may direct the browser custom code underlying the exemplary preview tag 400 to render the web page template 102 in the pane set up by the exemplary pane tag.

When a web page template 102 is rendered by the element behavior (i.e., custom code) of an exemplary preview tag 400, one or more exemplary resource tags 200 within the web page template 102 may need to be rendered. The browser requests the web page template 102 to render itself, and the HTML of the web page template 102 is returned, then the browser goes through the returned HTML and renders each tag. If a tag is an exemplary CTS tag 116, then the CTS tag 116 refers to the context object 700 to perform its element behavior, for example, in the case of an exemplary resource tag 200, the exemplary resource tag 200 may request the context object 700 to render a resource 204 identified in a resource attribute 202. Then the context object 700 can return content 104, e.g., XML that includes the remote content 104. Alternatively, an exemplary resource tag 200 may only request the context object 700 to return content 104 in HTML form directly. The context object 700 has the ability to replace the exemplary resource tag 200 with HTML representing the requested remote content 104. Thus, the context object 700 has the ability to render various resources 204, such as text, links, images, etc., into HTML.

A representation of an exemplary HTC file defining an exemplary context object 700 appears in Appendix D: "Exemplary HTC File Defining An Exemplary Context Object."

Implementations Using Element Behaviors

In one implementation, the CTS tags 116 are implemented as element behaviors. When a browser, such as MICROSOFT® INTERNET EXPLORER ("IExplorer"), encounters a CTS tag 116, code is executed to provide the functionality of each CTS tag 116. The element behaviors can be performed on the client side, as discussed above.

The ability to perform element behaviors is provided in some browsers, such as version of IExplorer, to define custom elements, such as the CTS tags 116, usable in the same way as everyday HTML elements in a web page 114. Element behaviors can be written in script using an HTML component (HTC) file, or implemented with a DHTML behavior. An element behavior can then be downloaded, parsed, and imported into a web page via a special processing instruction and permanently bound to a CTS tag 116. It should be noted that an element behavior can be implemented with either an HTC file or a DHTML behavior but each method is different.

Browsers that enable HTC files to define CTS tags 116 provide the quickest and easiest way to create element behaviors using scripting languages such as MICROSOFT VISUAL BASIC® SCRIPTING EDITION (VBSCRIPT), MICROSOFT JSCRIPT®, MICROSOFT WINDOWS® SCRIPT COMPONENT (WSC), and/or MICROSOFT VISUAL C++®. HTC files provide a mechanism to implement components in script as DHTML behaviors. Saved with an ".htc" extension, an HTC is an HTML file that contains script and a set of HTC-specific elements that define the exemplary CTS tag 116 (see Appendices A, B, and C).

Whereas a kind of behavior called an "attached behavior" (bound asynchronously to an HTML element) overwrites the default behavior of an element to which it is attached, element behaviors define new elements, such as the CTS tags 116. A web page document that employs CTS tags 116 typically has improved organization and less clutter, since element behaviors are encapsulated in an HTC file. DHTML behaviors defined with HTC files can be used in web pages within the same domain, so element behaviors are an excellent way of creating powerful, reusable CTS tags 116. Once an element behavior has been parsed and initialized, it renders a CTS tag 116 into a genuine HTML element, as the element behavior cannot be disconnected from the CTS tag 116.

To create and use a CTS tag 116 in a web page template 102 the element behavior of the CTS tag 116 is first defined in an HTC file and then the definition is imported into the web page template 102.

In some implementations, an HTML web page template 102 requires a few additional markings to import the CTS tag 116. For example, an HTML web page template 102 first declares a namespace, which is used to ensure that the CTS tag 116 has a unique qualifier. Then the CTS tag 116 is imported into the namespace. Thus, a "resource" namespace imports the implementation of an exemplary resource tag 200 from a resource.htc file:

<?IMPORT namespace="resource" implementation="resource.htc">

In some implementations, the import directive can be important in implementing an element behavior in the web page template 102. When a browser begins processing the import directive, it waits until the contents of the corresponding HTC file have downloaded completely before continuing. The manner of processing then causes the element behavior to be bound synchronously to the CTS tag 116.

The CTS tag 116 itself must be inserted somewhere in the body of the web page template 102. A CTS tag 116 can be used like any other tag, except that the CTS tag 116 uses its namespace as the prefix. Thus, an exemplary resource tag 200 block can be defined as follows:

<resource:resource-id="115"/></resource>

A CTS tag 116 does not always need to be defined as a block element, so the following empty element tag can be used.

<resource:resource/>

Figure 8:
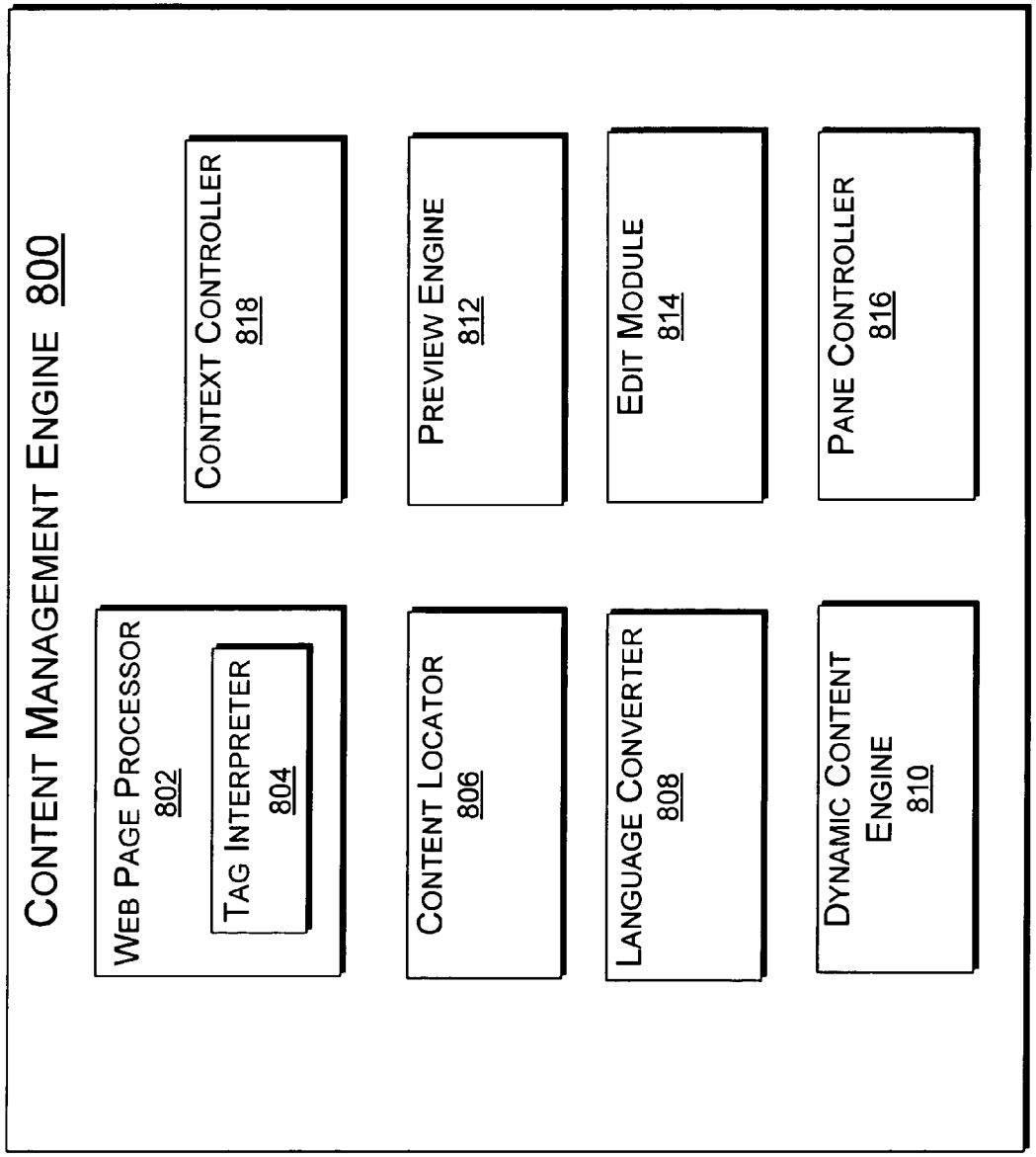
FIG. 8 is a block diagram of an exemplary content template engine.

FIG. 8 shows an exemplary content template engine 800. A web page processor 802, tag interpreter 804, content locator 806, language converter 808, dynamic content engine 810, preview engine 812, edit module 814, and pane controller 816 are communicatively coupled with each other and with a context controller 818 in the illustrated implementation of the subject matter.

A web page processor 802 may employ or comprise a web browser that includes an associated tag interpreter 804. When a web page template 102 is presented to the exemplary content template engine 800, the web page processor 802 executes template instructions, commonly in the form of markup indicator tags in a markup language. If custom tags are used, then the tag interpreter 804 obtains the logic assigned or bound to each custom tag by consulting tag definitions maintained in a file of memory space. If a custom tag has an associated element behavior, then the web page processor 802 may employ or comprise a web browser that has the capability to process element behaviors or to process whatever other means is used to associate custom logic with a custom markup tag.

The data content locator 806 identifies the location of content if a custom tag includes a location attribute or a reference to remote content 104.

The language converter changes the format and/or language of content 104 from a remote resource 204 to the same language and/or format being used in a web page template 102. Hence, if the web page template uses HTML, the content 104 from the remote resource 204 will be rendered in HTML so that the content can be substituted into the web page template 102.

The dynamic content engine 810 replaces an exemplary resource tag 200 with converted content and in some implementations has a capability to dynamically update the converted content in a web page template when underlying data content in a remote resource changes.

The preview engine 812 can display a web page template and dynamic content therein as a web page, showing changes to the web page template in real-time in the displayed web page.

The edit module 814 presents a user interface of edit controls for changing content 104 that underlies an exemplary resource tag 200. The content 104 being edited is usually a local copy of remote content residing on a remote resource 204.

The pane controller 816 may cast various of the functions performed by the exemplary content template engine 800 in different areas, windows, and/or panes of a computing device display. This may not only save screen space, but may help to logically organize user interfaces pertaining to the various parts of the exemplary content template system 100.

The context controller 818 may be a central data store of logic, rules, policies, and definitions regarding the relationships between the various parts of the exemplary content template engine 800 just described. In some implementations of the subject matter, a context controller 818 may be a software object, while in other implementations the context controller 818 may be a control logic module, etc.

Various other configurations of an exemplary content template engine 800 are possible, the illustrated implementation is presented as an example.

Figure 9:
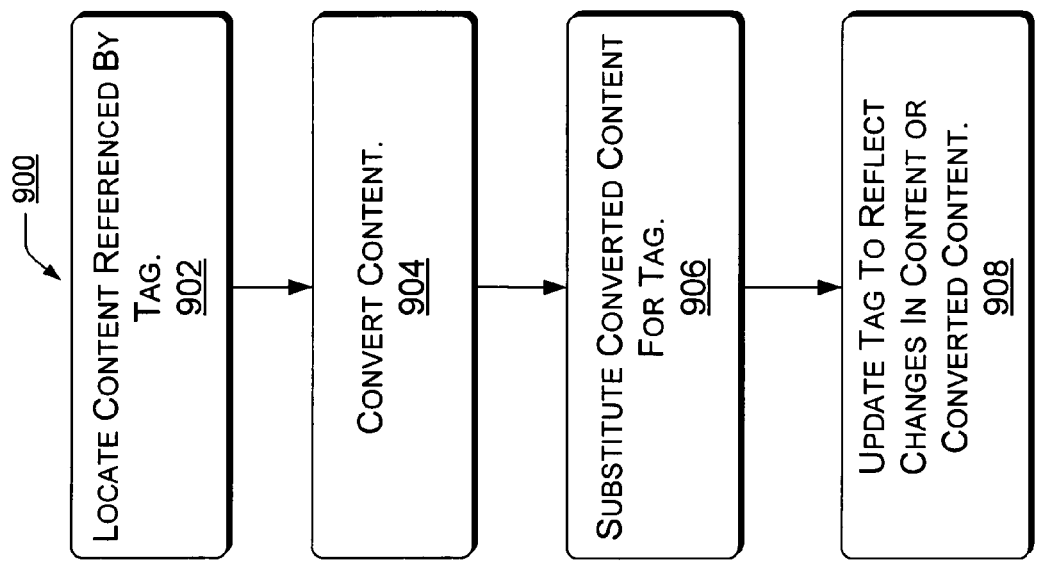
FIG. 9 is a flow diagram of an exemplary method of performing some aspects of the subject matter.

FIG. 9 shows an exemplary method 900 of performing an aspect of the content template system. In the flow diagram, the operations are summarized in individual blocks. The operations of the exemplary method 900 may be performed in hardware and/or as machine-readable instructions (software or firmware) that can be executed by a processor or a device, such as a device that includes an exemplary content template engine 800.

At block 902, content referenced by a tag in a web page template is located. The tag has associated custom logic that is invoked by a browser when the browser renders the tag. The custom logic can utilize a location ID if one is used as an attribute in the tag.

At block 904, after the resource is located, its content is converted to a language and data structure form that is the same or at least compatible with the language and structure used in the web page template. If the resource stores content in XML, for example, the XML is converted to HTML if that is the markup language of the web page template.

At block 906, the tag is replaced with the converted content. That is, before it is rendered, the tag represents the content.

At block 908, the tag is dynamically updated to reflect changes in the underlying content. For example, if the converted content is being modified through the agency of an edit function, e.g., another custom tag that allows a keyboard to change a local copy of the converted content, then the tag may be dynamically updated with each keystroke.

Figure 10:
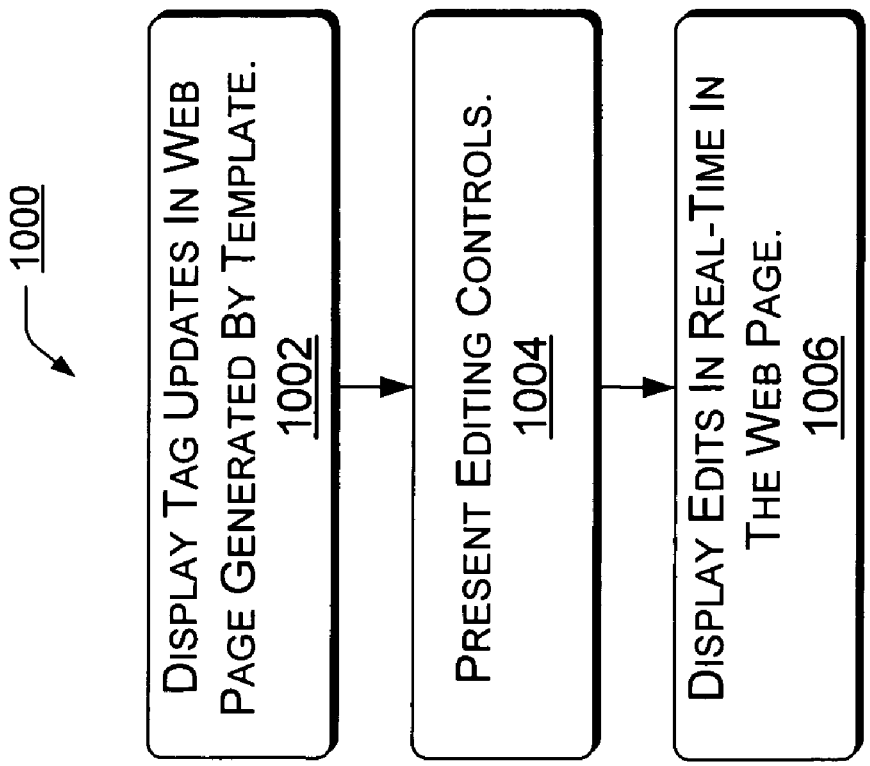
FIG. 10 is a flow diagram of another exemplary method of performing some aspects of the subject matter.

FIG. 10 shows another exemplary method 1000 of performing an aspect of the content template system. In the flow diagram, the operations are summarized in individual blocks. The operations of the exemplary method 1000 may be performed in hardware and/or as machine-readable instructions (software or firmware) that can be executed by a processor or a device, such as a device that includes an exemplary content template engine 800.

At block 1002, dynamic updates of the tag are displayed in real-time in a web page generated by a web page template that includes the tag.

At block 1004, editing controls are presented for editing the content via the web page template, wherein the editing is displayed in real-time in the web page generated by the web page template.

At block 1006, the editing controls and content being edited are displayed in one pane of a user interface while the web page showing the real-time edits is displayed in another pane of the user interface.

Exemplary Computing Device

FIG. 11 shows an exemplary computer 1100 providing a computing environment in which aspects of the subject matter could be practiced. The components of exemplary computer 1100 may include, but are not limited to, a processing unit 1120, a system memory 1130, and a system bus 1121 that couples various system components including the system memory 1130 to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Exemplary computer 1100 typically includes a variety of computer-readable media. Computer-readable media can be any available media that can be accessed by exemplary computer 1100 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by exemplary computer 1100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within exemplary computer 1100, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, the exemplary content template engine 800, application programs 1135, other program modules 1136, and program data 1137. Although the exemplary content template engine 800 is depicted as software in random access memory 1132, other implementations of an exemplary content template engine 800 can be hardware or combinations of software and hardware.

The exemplary computer 1100 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface such as interface 1150.

The drives and their associated computer storage media discussed above and illustrated in FIG. 11 provide storage of computer-readable instructions, data structures, program modules, and other data for exemplary computer 1100. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information into the exemplary computer 1100 through input devices such as a keyboard 1162 and pointing device 1161, commonly referred to as a mouse, trackball, or touch pad. Other input devices (not shown) may include a microphone, joystick, game pad, satellite dish, scanner, or the like. These and other input devices are often connected to the processing unit 1120 through a user input interface 1160 that is coupled to the system bus, but may be connected by other interface and bus structures, such as a parallel port, game port, or a universal serial bus (USB). A monitor 1191 or other type of display device is also connected to the system bus 1121 via an interface, such as a video interface 1190. In addition to the monitor 1191, computers may also include other peripheral output devices such as speakers 1197 and printer 1196, which may be connected through an output peripheral interface 1195.

The exemplary computer 1100 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to exemplary computer 1100, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computer networks, intranets, and the Internet.

When used in a LAN networking environment, the exemplary computer 1100 is connected to the LAN 1171 through a network interface or adapter 1170. When used in a WAN networking environment, the exemplary computer 1100 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the exemplary computer 1100, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

CONCLUSION

The foregoing describes an exemplary content template system. The subject matter described above can be implemented in hardware, in software, or in both hardware and software. In certain implementations, the exemplary content template system may be described in the general context of computer-executable instructions, such as program modules, being executed by a computer. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The invention claimed is:

1. A computer-executable method of editing a web page document and a remote content used by the web page document during a runtime of the associated web page using a system of mark-up language tags instead of using separate documents including one or more of a web page document, a style sheet document, and a web page template document, comprising:
   a set of markup indicator tags for a web page template, wherein each tag in the set is bound to an associated element behavior;
   a context object to coordinate the element behaviors of the tags;
   deploying an editor generated by an edit tag within the running web page document;
   locating the remote content referenced by a tag of the web page document, via an element behavior of the tag, wherein the remote content resides in a database remote from the web page document;
   converting the remote content via the element behavior into a markup language used in the web page document, wherein the remote content is of a compliant format or of a non-compliant format with the format of the markup language;
   processing a preview tag that precedes declaration of a web page template in the web page document, the web page template containing at least one of the tags of the system of tags, wherein the preview tag has associated logic for showing edits of the remote content as executing mark-up language in a web page corresponding to the web page template and rendered tags;
   presenting editing controls for editing the converted content in the web page template, wherein the editing displays dynamic updates of the one or more edits in real-time in the web page generated by the preview tag displaying the web page template;
   replacing the tag with the converted content in response to rendering the web page document;
   updating the tag in response to using the editor to change the remote content, by automatically converting the edited remote content via the element behavior into the markup language; and
   wherein when multiple tags link an executing web page to one or more content resources, content changes are propagated throughout the one or more content resources and linked panes of the web page.

2. A computer-executable method to assist authoring a web page document, the method using a system of mark-up language tags instead of separate web page, style sheet, and template documents, comprising:
   a set of markup indicator tags for a web page template, wherein each tag in the set is bound to an associated element behavior;
   a context object to coordinate the element behaviors of the tags;
   wherein when multiple tags link an executing web page to one or more content resources, content changes are propagated throughout the one or more content resources and linked panes of the web page;
   executing a layout tag comprising an element behavior that indicates a style format for application to a presentation of a data content; and
   executing a resource tag comprising an element behavior having logic for use in: locating the data content in a remote resource, converting the data content to a markup language used in the web page template, substituting the converted content for the resource tag in the web page template, and updating the converted content in the web page template in response to a change in the data content in the remote resource;
   executing a preview tag comprising an element behavior having logic to display dynamic updates of the converted content in real-time in a web page generated by the web page template;
   executing an edit tag comprising an element behavior to present editing controls for editing the converted content in the web page template, wherein the editing is displayed in real-time in the web page generated by the web page template.

3. A computer-executable method to assist authoring a web page document, the method using a system of mark-up language tags instead of separate web page, style sheet, and template documents including executing a preview tag comprising an element behavior for a web page template, comprising:
   a set of markup indicator tags for a web page template, wherein each tag in the set is bound to an associated element behavior;
   a context object to coordinate the element behaviors of the tags;
   reading a reference in the preview tag to at least part of the web page template to display as a currently executing web page;
   displaying editing controls defined by the element behavior of the preview tag; and
   executing logic to: dynamically update the currently executing web page to display changes in content, style, and layout in the part of the web page template referred to by the reference when the web page template is edited by the editing controls;
   wherein the part of the web page template being referenced includes multiple tags and when multiple tags link an executing web page to one or more content resources, content changes are propagated throughout the one or more content resources and linked panes of the web page;
   wherein the change in content of the dynamically updated web page is displayed based on a corresponding change in content in a remote content resource accessed by a tag in the web page template.

4. A content template system in a computer-readable media to assist authoring a web page document, the system including a collection of mark-up language tags to replace using separate web page, style sheet, and template documents, comprising:

a set of markup indicator tags for a web page template, wherein each tag in the set is bound to an associated element behavior;

a context object to coordinate the element behaviors of the tags;

wherein the tags link an executing web page to one or more content resources, such that content changes are propagated throughout the one or more content resources and linked panes of the web page;

wherein a tag of the collection is bound to an element behavior programmed to locate remote content referenced by an attribute of the tag, convert the remote content into a markup language used in the web page template, replace the tag with the converted content, and dynamically update the converted content in the web page template when the remote content changes;

wherein a tag of the collection is bound to an element behavior programmed to display dynamic updates of the converted content in real-time in a web page generated by the web page template;

wherein a tag of the collection is bound to an element behavior programmed to present editing controls for editing the converted content in the web page template and for displaying the editing in real-time in the web page generated by the web page template.

5. The content template system as recited in claim 4, further comprising a browser, wherein the browser renders the web page template and renders the tags bound to the element behaviors.

6. One or more computer readable media containing instructions that are executable by a computer to perform actions for using a system of tags to replace using separate documents in authoring a web page, comprising:

a set of markup indicator tags for a web page template, wherein each tag in the set is bound to an associated element behavior;

a context object to coordinate the element behaviors of the tags;

wherein the tags link an executing web page to one or more content resources, such that content changes are propagated throughout the one or more content resources and linked panes of the web page;

locating content referenced by a markup tag comprising an element behavior in a web page template;

converting an original version of the content into a markup language version using the same markup language being used in the web page template;

replacing the markup tag with the markup language version of the content; and dynamically updating the markup language version of the content in the web page template when the original version of the content changes;

wherein the tags link an executing web page to one or more content resources, such that content changes are propagated throughout the one or more content resources and linked panes of the web page displaying dynamic updates of the markup language version of the content in real-time in a web page generated from the web page template;

presenting editing controls for editing the markup language version of the content in the web page template, wherein the editing is displayed in real-time in the web page generated by the web page template;

wherein edits to the markup language version are propagated to the original version of the content and to additional panes of the web page linked to the original content by additional tags.

* * * * *